(12) United States Patent
Brittner et al.

(10) Patent No.: US 10,721,018 B2
(45) Date of Patent: Jul. 21, 2020

(54) QUALITY OF SERVICE AND STREAMING ATTRIBUTES FOR A DATA STORAGE DEVICE

(71) Applicants: Rod Brittner, Rancho Santa Margarita, CA (US); Ron Benson, Boulder, CO (US)

(72) Inventors: Rod Brittner, Rancho Santa Margarita, CA (US); Ron Benson, Boulder, CO (US)

(73) Assignee: Rod Brittner, Rancho Santa Margarita, CA (US)

( * ) Notice: Subject to any disclaimer, the term of this patent is extended or adjusted under 35 U.S.C. 154(b) by 80 days.

(21) Appl. No.: 15/590,905

(22) Filed: May 9, 2017

(65) Prior Publication Data

US 2018/0091258 A1     Mar. 29, 2018

Related U.S. Application Data

(63) Continuation of application No. 12/670,589, filed as application No. PCT/US2008/008923 on Jul. 23, 2008, now abandoned.

(60) Provisional application No. 60/951,398, filed on Jul. 23, 2007.

(51) Int. Cl.
*G06F 3/06* (2006.01)
*H04L 1/00* (2006.01)

(52) U.S. Cl.
CPC .......... *H04L 1/0026* (2013.01); *H04L 1/0001* (2013.01); *G06F 3/061* (2013.01); *G06F 3/0659* (2013.01); *G06F 3/0676* (2013.01)

(58) Field of Classification Search
CPC ..................................................... G06F 3/0676
See application file for complete search history.

(56) References Cited

U.S. PATENT DOCUMENTS

| | | | | |
|---|---|---|---|---|
| 5,138,499 A * | 8/1992 | Tamegai | ............ | G11B 15/1875 360/13 |
| 5,541,784 A * | 7/1996 | Cribbs | ............... | G11B 5/59633 360/75 |
| 5,946,156 A * | 8/1999 | Schwarz | ............... | G11B 5/5504 360/75 |
| 6,393,511 B1 * | 5/2002 | Albrecht | ............... | G11B 21/083 360/48 |
| 2002/0099854 A1 | 7/2002 | Jorgensen | | |
| 2005/0237872 A1 * | 10/2005 | Nguyen | ............... | G06Q 20/123 369/44.14 |
| 2006/0022054 A1 | 2/2006 | Elhamias et al. | | |

(Continued)

*Primary Examiner* — Farley Abad
(74) *Attorney, Agent, or Firm* — Davis Graham & Stubbs LLP

(57) ABSTRACT

A host/device interface coupled between a host and a storage device, and including a data interface and a Quality of Service (QoS) and configured to communicate a QoS signal with the host. The QoS interface cooperates with the data interface to selectively manage a storage QoS on the storage device. A method is provided for storing data on a data medium including receiving a Quality of Service (QoS) command; selecting a portion of the data medium on which to store a data stream; forming a stream chunk from a portion of the data stream; configuring a transducer to store the stream chunk on the data medium in response to the QoS command; and storing the data on the data medium, such that the storing conforms to a QoS command value.

8 Claims, 11 Drawing Sheets

(56) References Cited

U.S. PATENT DOCUMENTS

| | | |
|---|---|---|
| 2006/0101198 A1 | 5/2006 | Cho et al. |
| 2007/0127150 A1 | 6/2007 | Cho et al. |
| 2007/0153825 A1 | 7/2007 | Cho et al. |
| 2007/0185902 A1* | 8/2007 | Messinger ............ G06F 3/0619 |
| 2008/0002272 A1* | 1/2008 | Riedel ...................... G11B 5/02 |
| | | 360/55 |

* cited by examiner

| QoS TAG (2-bit binary) | QoS BER (-log$_{10}$(BER)) | QoS CMD COMPLETION TIME (CCT) | AD RATIO |
|---|---|---|---|
| 0x00 | 9 | <0.1s | 2.00 |
| 0x01 | 12 | 0.1s | 1.67 |
| 0x10 | 15 | 1s | 1.33 |
| 0x11 | 18 | 5s | 1.00 |

FIG. 6

QUALITY OF SERVICE AND STREAMING ATTRIBUTES FOR A DATA STORAGE DEVICE

CROSS-REFERENCE TO RELATED APPLICATION

This application claims the benefit of prior-filed provisional patent application U.S. Ser. No. 60/951,398, filed Jul. 23, 2007, which is incorporated by reference herein in its entirety.

FIELD OF THE INVENTION

This invention is generally related to storage devices, and more particularly to storage devices which store large data files.

BACKGROUND OF THE INVENTION

Commonly, storage devices and their host refer to data in 512 byte block atomic units. Typically, these data storage devices reference data content by multiple data blocks. Each block can be given a unique logical block address, or LBA. In general, the host will control the assignment of data to LBAs at its discretion. A host also may manage multiple storage devices, and may track the assignment of data and LBAs to each device.

A storage device such as a hard disk drive (HDD) can apply certain advantages to the data storage and retrieval process if it has prior knowledge about the data. For example, knowledge that certain data content is contiguous in some way to other data can be typical and quite useful in many regards. However, the typical HDD is designed to support the requirements of random access storage. That is, no assumption can generally be made about a given data block in terms of its relative association to any other data block.

The ATA-7 AV Streaming Feature set for example makes reference to the behavior of a streaming command. A read or write streaming command may tell the storage device that the host wishes to place a time limit on the completion of the command of interest. The ATA-7 specification refers to "streaming commands," which provide a protocol for the host to prioritize stream integrity over data integrity during the handling of a given streaming command. The constraints imposed by the host for a streaming command under this specification are expressly limited to the behavior of the command, and not to the behavior of the data.

The ATA-7 streaming commands and specification attempt to provide a framework for structured streaming data storage. However, random access to data may be allowed during a streaming operation because streaming commands may access any user LBA on a device. Also, random access to data may be allowed during a streaming operation because streaming and non-streaming commands may be interspersed during a streaming operation sequence. Thus, the framework may not provide a clear and unambiguous mechanism for assigning streaming properties to the data itself. The lack of such a clear streaming assignment may leave the storage device unable to ascribe streaming attributes to the host data content. Therefore, there is a need for an apparatus and method that allows a storage device to apply the advantages of streaming to the data stored to its media.

SUMMARY OF THE INVENTION

Embodiments of the present invention provide host/device interface, having a data interface communicatively coupled to transfer data between a host and a storage device; and a Quality of Service (QoS) interface coupled to the data interface and configured to communicate at least one QoS signal with the host. The QoS interface cooperates with the data interface to selectively manage a storage QoS on the storage device. Also, some data storage apparatus include a hard disk drive. In addition, the storage QoS can include a data behavior value. Furthermore, in certain embodiments, a transducer coupled to the data interface, and the host cooperates with the QoS interface to selectively manage a storage QoS using the transducer. In some embodiments, the storage QoS comprises a data behavior value.

Also provided are embodiments of a storage device, including a data storage medium; a transducer selectively coupled to communicate with the data storage medium; and a Quality of Service (QoS) interface configured to communicate a QoS command. The QoS interface also is configured to cause the transducer to selectively couple to the data storage medium in response to the QoS command. In certain embodiments, the data storage medium includes a plurality of data blocks configured in response to the QoS command. Also, in some embodiments the QoS command includes a data behavior command. In selected embodiments, the data storage medium includes a first plurality of data blocks configured in response to a first QoS command, and a second plurality of data blocks configured in response to a second QoS command. The QoS command can include a data behavior command. In addition, in certain selected embodiments the data storage medium includes a semiconductor memory, and the QoS command is a data behavior command.

Moreover, embodiments of a method for storing data on a data medium are provided in which the method includes receiving a Quality of Service (QoS) command; selecting a portion of the data medium on which to store a data stream; forming a stream chunk from a portion of the data stream; configuring a transducer to store the stream chunk on the data medium in response to the QoS command; and storing the data on the data medium, such that the storing conforms to a QoS command value.

BRIEF DESCRIPTION OF THE DRAWINGS

The present invention is illustrated by way of example and not by limitation in the accompanying figures, in which like references indicate similar elements, and in which:

FIG. 6 is a tabular depiction of example Quality of Service variables in accordance with the teaching of the invention herein;

FIG. 9C FIG. 9B is a block diagram illustration of a stream chunk having an appended RAW pad, as in FIGS. 9A and 9B, having a re-allocation overrun;

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE INVENTION

Figure 1:
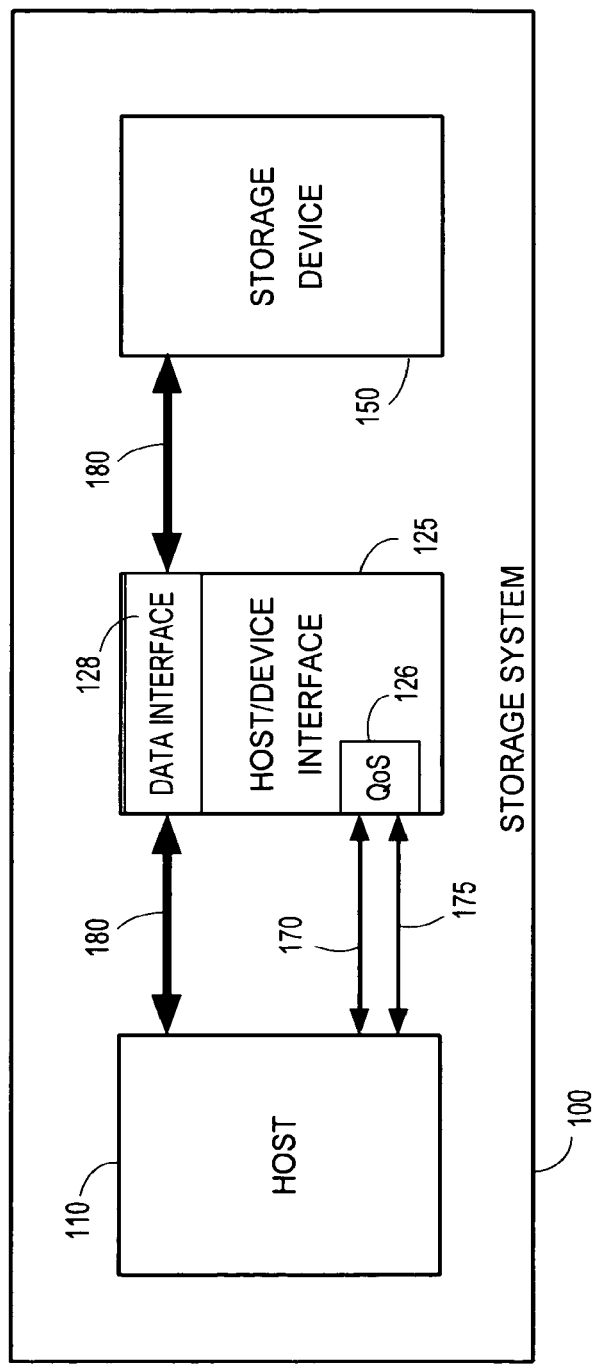
FIG. 1 is a block diagram of an embodiment of a data storage system in accordance with the teaching of the invention herein.

In FIG. 1, storage system 100 in accordance with present embodiments may include host 110, host/device interface 125, and storage device 150. Host/device interface 125 can be a data interface communicatively coupled between host 110 and storage device 150. Host 110 may be a computer system executing the software BIOS and/or operating system device driver controlling device 150 and host/device interface 125. In general, host/device interface 125 implements the transport, link, and physical layers of host 110. Thus, data 180 may be transferred between host 110 and storage device 150 by way of host/device interface 125. Although storage device 150 can be a hard disk drive (HDD), storage device 150 generally may be any form of storage device that may be configured to communicate data with host 110 over host/device interface 125, and may include a semiconductor memory storage device, a holographic storage device, an optical storage device, or a flash memory storage device. In accordance with present embodiments, host 110 may control a Quality of Service (QoS) of data 180 communicated with storage device 150. Host/device interface 125 may include a QoS interface 126, which may be coupled to one or both of host 110 or storage device 150, and may cooperate with data interface 128 of host/device interface 125 to manage a storage QoS on storage device 150. QoS interface 126 may facilitate control of data QoS on storage device by way of control signal lines communicating QoS select signal 170, QoS sense signal 175, or both, between host 110 and host/device interface 125. Typically, storage QoS is defined by host 110 and may include, without limitation, one or both of a data behavior or a command behavior. Non-limiting examples may include uncorrectable error rate or time-limited command response, respectively. Other parameters also may be used by host 110 to define QoS. The QoS desired by host 110 can be explicitly shared with storage device 150, and may be either more or less constrained than the current industry practice, for example as provided as a default BER for storage device 150. In one non-limiting example, host 110 may choose an uncorrectable error rate to be no worse than about $10^{-9}$ for audio-video (AV) file content and to be no worse than about $10^{-18}$ for system control files. Typically, the uncorrectable error rate for an HDD may be on the order of about one sector error in $10^{14}$ bits. Similarly, typical AV content may be broadcast to a home network with a post-FEC (forward error correction) BER (bit error rate) less than or equal to about $10^{-8}$. A host, such as host 110, may exchange one or more commands or signals with one or both of host/device interface 125 or storage device 150 by which host 110 may select a desired data range size for streaming data to be transferred, or a QoS for such data, or both. In addition, host 110 may use host/device interface 125 to create and maintain one portion of storage device 150 having a first QoS or a first data type, which may be different from a second QoS or a second data type on another portion of storage device 150.

Figure 2:
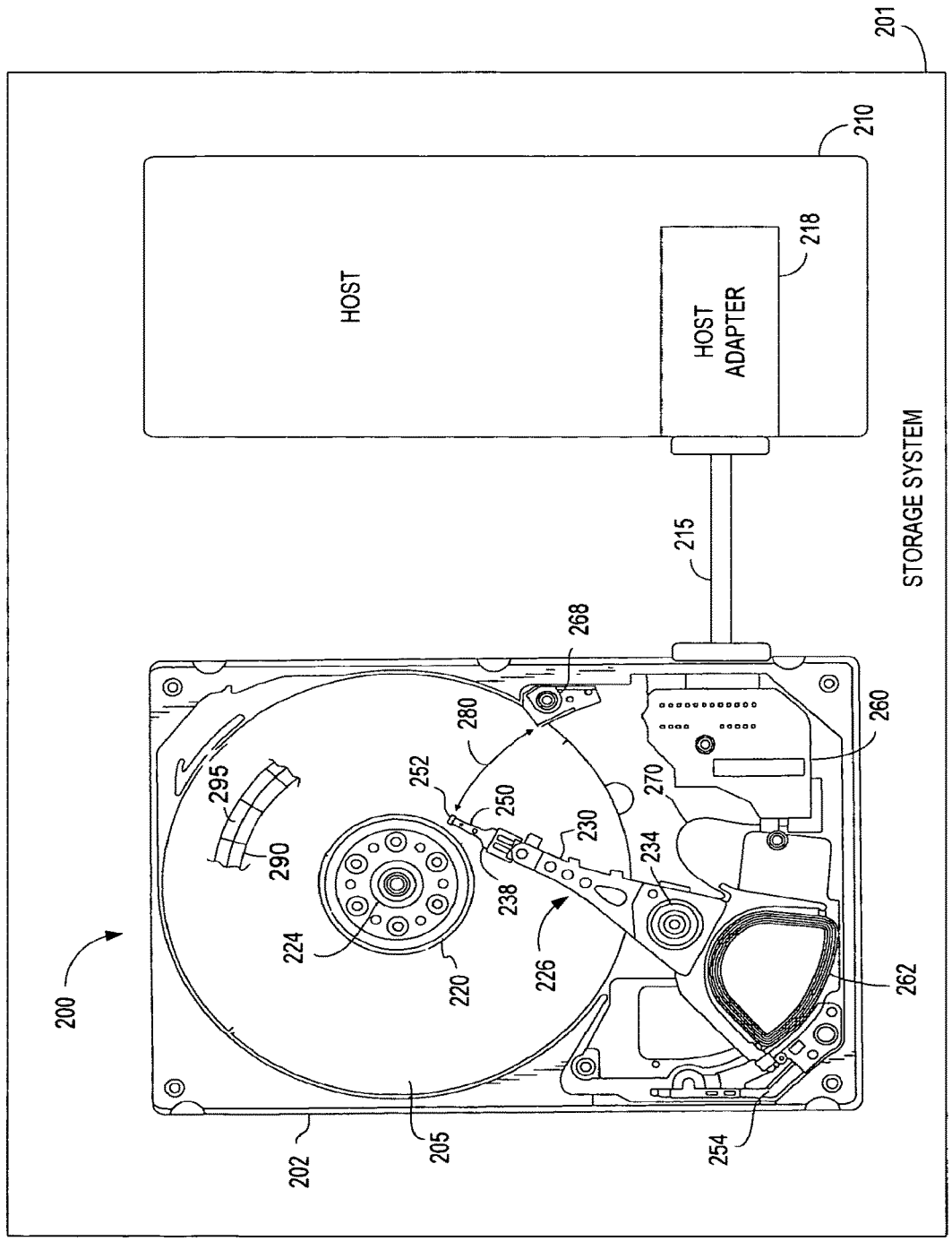
FIG. 2 is a graphical depiction of another embodiment of a data storage system, in accordance with the teaching of the invention herein.

In FIG. 2, disk drive 200 illustrates one non-limiting example embodiment of a storage device in accordance with the present embodiments, such as storage device 104 in FIG. 1. In addition, embodiments of storage system 201 may be generally comparable to storage system 100 in FIG. 1. Disk drive 200 generally includes base plate 202 and a cover (not shown), which may be disposed on base plate 202, to define an enclosed housing or space for disk drive components. Disk drive 200 may be coupled by link 215 to host 210, for example, by way of host adapter 218. Disk drive 200 includes one or more data storage disks 205, or platters, of any appropriate computer-readable data storage media. Typically both of the major surfaces of each data storage disk 205 include a plurality of concentrically disposed tracks for data storage purposes. Each disk 205 is mounted on a hub or spindle 220, which in turn is rotatably interconnected with disk drive base plate 202 and/or cover. Multiple data storage disks 205 would be mounted in vertically spaced and parallel relation on spindle 220. Rotation of disk(s) 205 is provided by a spindle motor 224 that is coupled to spindle 220 to simultaneously spin data storage disk(s) 205 at an appropriate rate.

Disk drive 200 also includes an actuator arm assembly 226 that pivots about a pivot bearing 234, which in turn, is rotatably supported by base plate 202 and/or cover. Actuator arm assembly 226 includes one or more individual rigid actuator arms 230 that extend out from near pivot bearing 234. Multiple actuator arms 230 would be disposed in vertically spaced relation, with one actuator arm 230 typically being provided for each major data storage surface of each data storage disk 205 of disk drive 200. Other types of actuator arm assembly configurations could be utilized as well, such as an "E" block having one or more rigid actuator arm tips or the like that cantilever from a common structure. Movement of actuator arm assembly 226 can be provided by an actuator arm drive assembly, such as a voice coil motor 262. Typically, voice coil motor 262 is a magnetic assembly that can control the operation of actuator arm assembly 226 under the direction of disk drive controller 260. In general, voice coil motor 262 and disk drive controller 260 cooperate to form a self-correcting, closed control system, or servo, which can spatially position transducer 252 precisely relative to the proximate surface of disk 205. Servo fields contain the positioning information for transducer 252 used to locate the head over a given track and may be implemented in well-known disk drive servo techniques, including without limitation, an embedded servo technique, a dedicated servo technique, or a wedge servo technique.

Any appropriate actuator arm assembly drive type may be utilized by disk drive 200, including, for example, a linear actuator positioner or a rotary actuator positioner. A linear actuator positioner may be suitable for the case where actuator arm assembly 226 is interconnected with base plate 202 and/or cover for linear movement versus the illustrated pivoting movement about pivot bearing 234.)

Load beam or suspension 238 cantilevers from a free end of each actuator arm 230 or actuator arm tip. Slider 250 is disposed at or near the free end of each suspension 238. At least one transducer 252 (or head) may be mounted on a distal end of slider 250. Transducer 252 can be used to write data to storage disk 205, and also may be used to read data previously stored on storage disk 205. In certain selected embodiments, a separate read transducer (not shown) may be mounted on suspension 238, may be set apart from, and may be proximally disposed relative to, transducer 252. Other configurations for read and write transducers also may be employed, as will be described in FIG. 9 Transducer(s) 252 of disk drive 200 may be used in disk drive read/write operations. Heads employing various types of read/write technologies may be used by the head on slider 250, including without limitation, a metal-in-gap ferrite (MIG), thin film inductive (TFI) heads, a magnetoresistive (MR) head, a giant magnetoresistive (GMR) head, a tunneling MR head (TMR), or a perpendicular magnetic recording (PMR) head. Of course, other suitable transducers, operable within the context of disk drive 200, also may be used.

Typically suspension 238 is biased at least generally toward its corresponding disk 205 by a spring-like force. The biasing forces exerted by suspension 238 on its corresponding slider 250 thereby attempt to move slider 250 in the direction of its corresponding disk 205. Typically this biasing force is such that slider 250 flies above the surface of corresponding disk 205, when disk 205 is rotated with a sufficient velocity.

Each head can be interconnected with drive controller 260 of disk drive 200 by flexible cable 270 may be mounted on actuator arm assembly 226. Signals can be exchanged to effect disk drive read and/or write operations between head 252 on slider 250, and corresponding data storage disk 205. In this regard, voice coil motor 262 pivots actuator arm assembly 226 to simultaneously move each head on its slider 250 along a path 280 and "across" corresponding data storage disk 205 to position the head at the desired/required radial position on disk 205 (i.e., at the correct track on data storage disk 205) for disk drive read/write operations.

When disk drive 200 is not in operation, actuator arm assembly 226 is pivoted to a "parked position" to dispose each slider 250 typically at least generally at or beyond a perimeter of its corresponding data storage disk 205, but in any case in vertically spaced relation to its corresponding disk 205. This is commonly referred to in the art as being a dynamic load/unload disk drive configuration. In this regard, disk drive 200 includes a ramp assembly 268 that is disposed beyond a perimeter of data storage disk 205 to typically both move corresponding slider 250 vertically away from its corresponding data storage disk 205 and to also exert somewhat of a retaining force on actuator arm assembly 226. Any configuration for ramp assembly 268 that provides desired "parking" function may be used. disk drive 200 could also be configured to be of the contact start/stop type, where actuator arm assembly 226 would pivot in a direction to dispose slider(s) 250 typically toward an inner, non-data storage region of corresponding data storage disk 205. Terminating the rotation of data storage disk(s) 205 in this type of disk drive configuration would then result in slider(s) 250 actually establishing contact with or "landing" on their corresponding data storage disk 205, and slider 250 would remain on disk 205 until disk drive operations are re-initiated. In either configuration, it may be desirable to at least attempt to retain actuator arm assembly 230 in this parked position if disk drive 200 is exposed to shock. In this regard, disk drive 200 includes an actuator arm assembly latch 254 that moves from a non-latching position to a latching position to engage actuator arm assembly 226 so as to preclude the same from pivoting in a direction which would tend to drag slider(s) 250 across their corresponding data storage disk 205. slider 250 of disk drive 200 may be configured to "fly" on an air bearing during rotation, of its corresponding data storage disk 205, at a sufficient velocity.

Each platter surface of data storage disk(s) 205 may be divided into radially-disposed portions called tracks. Track 290 may be arranged having a pitch of approximately zero (0.0) about a central axis, as generally a concentric circle. Also, a first track may be disposed to be overlapped by a second track, a second track by a third, and so on, such that tracks may be more tightly packed on a media surface. Such an overlapping track arrangement is illustrated with respect to FIG. 11. In addition, in selected ones of the present embodiments, a track may be arranged having a non-zero pitch, as generally a spiral. In general, a cylinder is a collection of tracks from all recordable surfaces having about the same radial distance from the disk drive circumference. A track may contain circumferentially-disposed arcuate segments called sectors, each of which may represent a unit of storage on the surface of the disk, and the smallest unit of data which can be physically written to or read from the disk. Each sector may correspond to a physical data block, and a physical block address may be identified by a corresponding cylinder, track, and sector. This correspondence may be unique. A logical sector may represent at least one physical data block, and also may be uniquely addressable, for example, by a logical block address (LBA). Logical block addresses may represent a linear mapping of logical sectors from 1 to n. In general, a physical sector can be a group of contiguous logical sectors that are read from or written to the device media in a single operation.

Returning to FIG. 1, functionalities and operations provided by host/device interface 125, in accordance with present embodiments, may be provided by one or both of host bus adapter 218 in host 210 or drive controller 260 in disk drive 200, may be distributed between host bus adapter 218 and drive controller 260, or may be provided by cooperation between host bus adapter 218 and drive controller 260. Such functionalities and operations may be implemented in hardware, in software, in firmware, or in an operative combination thereof. Link 215 may be a serial link or a parallel link, and may be wired or wireless.

In general, storage devices, such as disk drive 200, are designed as random-access media. However, random access causes the effective transfer rate of a device to decrease, because no data are transferred during the access time. Access time may include seek time, settle time, rotational latency time and command overhead time. Seek time is the amount of time disk drive 200 takes to move transducer 252 to a desired location on a surface of data storage disk 205. Rotational latency time is the amount of delay in obtaining information from disk 205 due to the rotation of disk 205. Settle time refers to the amount of time required, after the actuator has moved the head assembly during a seek operation, for the heads to stabilize sufficiently for the data to begin to be read. Command overhead refers to the time that elapses from when a command is given to the hard disk until something actually starts happening to fulfill the command. Other factors, such as head and cylinder switch times, and internal sustained transfer rate also may increase access time. For multiple, frequent reads of random sectors on the disk, random access may be a significant performance-limiting factor, particularly in streaming data applications, including audio/video (A/V) streaming data applications.

The performance of storage devices also may be constrained by storage device industry interface specifications and standards that are designed for random access to blocks of data, even when handling streaming data. To that end, Committee T13/1532D of the American National Standard Institute has implemented a limited AV streaming feature set in Section 4.17 of the American National Standard for Information Technology, AT Attachment with Packet Interface-7 (ATAPI-7). Such standard generally describes and constrains the behavior of a streaming command, not the data itself, and provides a protocol for the host to prioritize stream integrity over data integrity during the handling of a given streaming command. For example, a read or write streaming command may notify storage device 150 that host 110 wishes to place a time limit on the completion of an issued streaming command. However, in keeping with the design for random access to blocks of data, the standard allows streaming commands may access any LBA on a storage device, as well as for interspersing streaming and non-streaming commands in a command flow. Such behaviors may encourage random access to data, and may penalize streaming operations with unnecessary overhead. By contrast, present embodiments herein provide apparatus and methods by which the respective behaviors of a streaming command, and of the streaming data itself, may be prescribed and constrained. For example, host 110 may declare a streaming data range for a corresponding data stream to be written to storage device 150, and a desired QoS for the data within streaming data range. In selected embodiments, dynamic configurability may be possible in existing interface protocols, including, without limitation, ATA protocol, SAS protocol, SCSI protocol, or Fiber Channel protocol, by allowing device 150 to know certain attributes of the data content, for example, streaming data range or desired QoS for the streaming data by way of a simple extension.

The basic reliability requirements for a hard disk drive can be related to the magnetic stability of the data written to the disk surface, and to the maximum number of errors allowed when the user data are read back (bit error rate or BER). In order to ensure disk drive reliability, HDD are often manufactured to stringent BER requirements, for example, a current HDD nominal BER provides for about 1 error in about every $10^{14}$ to $10^{15}$ bits. However, an acceptable BER can vary by application and data type. For example, a BER of about $10^{-15}$ may be a requirement for a high-reliability data server HDD, yet a low-end desktop computer HDD may only need to meet a BER of about $10^{-12}$. Also, it may be desirable to provide a BER of about $10^{-18}$ for computer system files, but to provide a BER of about $10^{-6}$ for CD-quality audio data. Thus, in accordance with the present embodiments, a Quality of Service Bit Error Rate (QoS BER) may be tailored to suit reliability expectations for a given application, data type, or both. On a storage device such as disk drive 200, a first QoS BER may be assigned to a first data stream, a second QoS BER may be assigned to a second data stream, and other QoS BER may be assigned to respective ones of other data streams. QoS assignment may be performed on-the-fly, while disk drive 200 is in the field, or during a processing step, for example, by a device manufacturer, an OEM, or a vendor.

Figure 3:
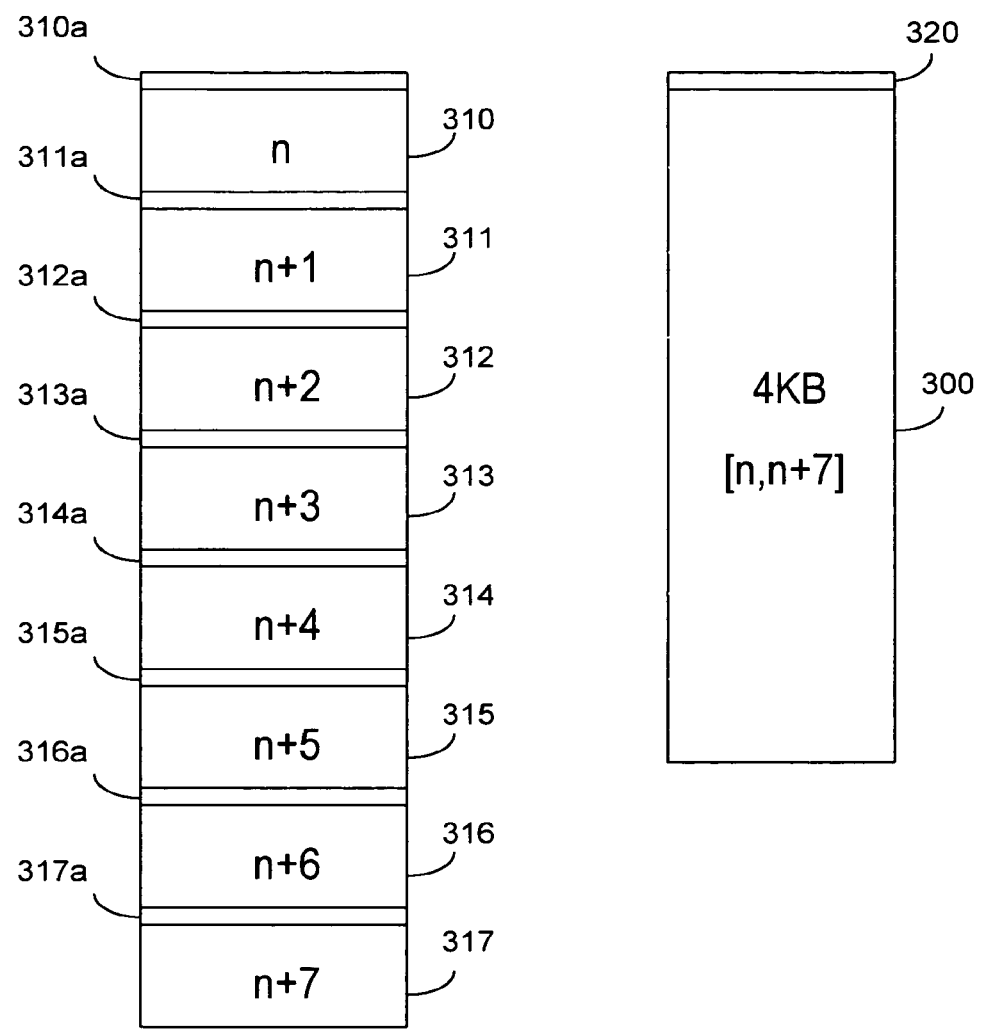
FIG. 3 is a block diagram depicting a stream block, in accordance with the teaching of the invention herein.

By treating disk drive 200, at least in part, as a streaming device, instead of as a random access device, it may be possible to yield a significant increase in performance and reliability. In addition, it may be possible to substantially reduce access time, due to from reductions in random access-related overhead, such as seek time, settle time, rotational latency time, and command overhead time. Also, data storage disk 205 may be configured to employ physical or logical blocks, which may include plural, contiguous 512-byte blocks. For example, as illustrated in FIG. 3, streaming block 300 in accordance with selected ones of present embodiments may be formed by concatenating eight (8) contiguous 512-byte blocks 310-317, thus yielding 4 KB streaming block 300. A streaming protocol in accordance with embodiments herein may allow host device 210 to retain operations with a 512-byte block size, while writing 4 KB blocks to be written to disk drive 200. Concatenation, as described herein, may lead to format efficiencies, by tending to reduce the number of synchronization fields and intersector gaps, as may be found in respective overhead field 310a-317a for each of blocks 310-317. By comparison, streaming block 300 may include one such overhead field 320. Further, a stream chunk may formed from one or more streaming blocks, and may be used as a unit of streaming data that may be read or written by host 210 during an operation.

Figure 4:
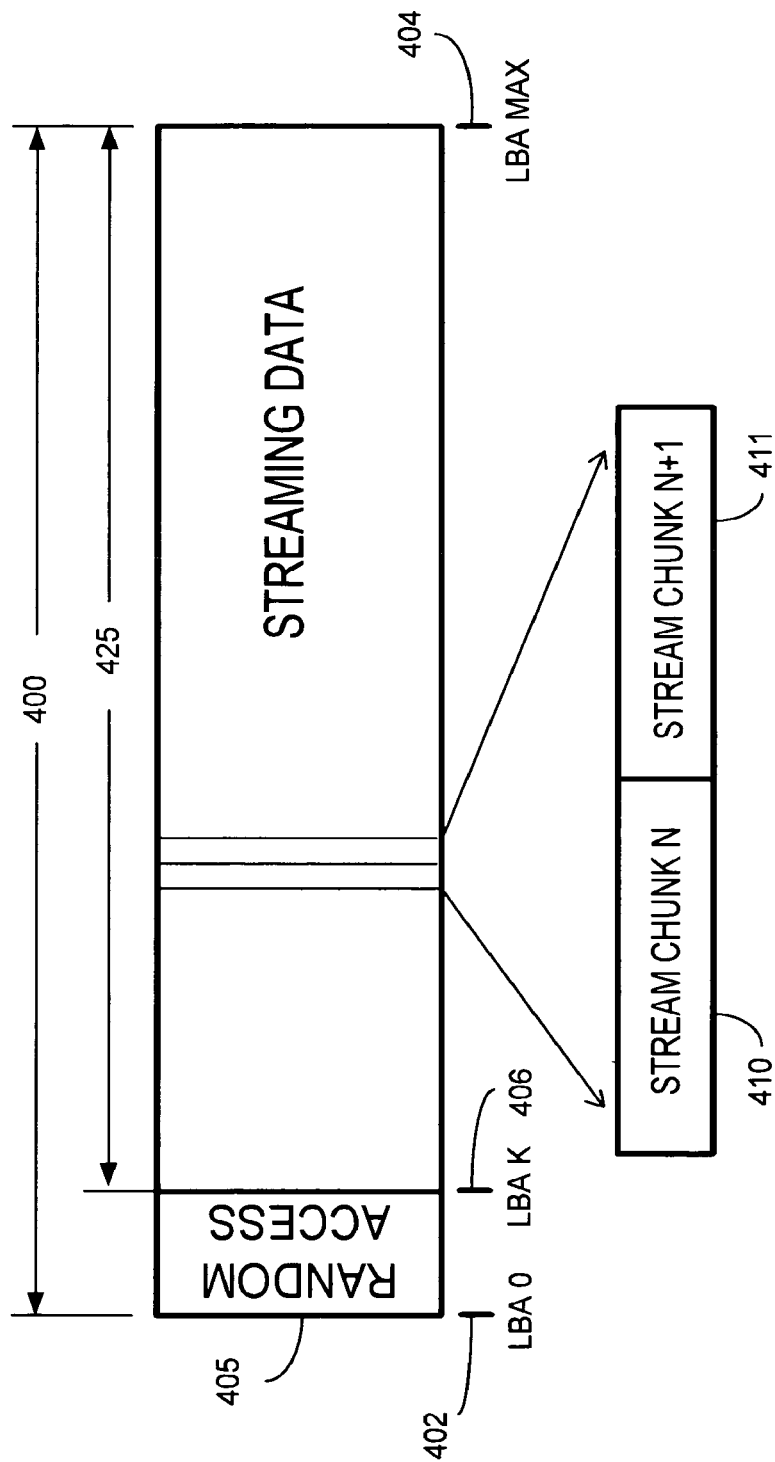
FIG. 4 is a block diagram depicting a stream chunk, in accordance with the teaching of the invention herein.

As illustrated in FIG. 4, logical block address space 400 of disk device 200 ranges from the zeroth logical block address (LBA 0) 402 to the maximum logical block address (LBA MAX) 404. In some embodiments, disk drive 200 may be configured such that at least a portion 405 (here LBA 0 402 to the kth logical block address (LBA K) 406 of the logical block address space 400 may be allocated to random access data. The remaining logical block address space 425 (LBA MAX-LBA K) may be allocated to. streaming data, which may include stream chunk (N) 410, and stream chunk (N+1) 411. Each of stream chunk 310,311 typically corresponds to a respective predetermined group of contiguous LBAs. Streaming data address space 425 may be associated with an address space QoS, which may be predetermined or may be selectable. In addition, streaming data address space 325 may be partitioned into plural streaming data address subspaces 430, 440, each of which may be associated with a different, respective QoS. A QoS may become associated with a respective stream chunk 410, 411, for example, by operation of host 210 or disk drive 200. Host 210 may be configured to select one or more stream chunks 410, 411, and respective QoS associated therewith, and to perform a streaming operation on selected stream chunks 410, 411. A streaming operation may include, without limitation, a streaming read operation, a streaming write operation, or both. In a streaming operation within the context of FIG. 1, a streaming chunk may be managed by one or more of host 110, host/interface device 125, or storage device 150.

A streaming read operation also can include a streaming read/verify operation, such as a Read-After-Write (RAW) operation, in which data can be recorded onto surface of data storage disk 205 during a streaming write operation and later verified in their final form by a streaming read operation. A RAW operation can increase reliability of data stored on disk drive 200, for example, because a RAW operation can detect, and cause to be corrected, write errors, errors caused by adjacent data patterns, and media errors, for example, from media faults or flaws. Typically, a RAW operation is performed on a preceding track of data storage disk 205 to which data were recorded during a streaming write operation. In general, where data in their final form are found to have an error by a RAW operation, the correct data corresponding to the error location can be either re-written to the original location, if possible, or written to a spare storage location, such as a RAW pad. In some embodiments, a RAW operation may be performed after an entire data stream is written. In other embodiments, a RAW operation may be performed after a portion of a data stream is written. In still other embodiments, a RAW operation may be performed on-the-fly generally concurrently with a streaming write operation.

In general, the Quality of Service Bit Error Rate (QoS BER) may be manipulated by changing the areal density, or recording capacity, on data storage disk 205. The areal density, which is measured in data bits per square inch, is the product of bits per inch of track (BPI) and the number of tracks per inch (TPI). Thus, areal density on data storage disk 205 can be manipulated by changing BPI, TPI, or both. Moreover, in certain selected embodiments, tracks of disk drive 200 may be provided as spirals, rather than as concentric circles. For applications or data types in which the QoS BER is higher than the HDD nominal BER, that is, the QoS BER reflects an acceptance of a higher read error rate, an increase in the effective device storage capacity may be realized. Conversely, for applications or data types in which the QoS BER is lower than the HDD nominal BER (fewer errors allowed), a decrease in the effective device storage capacity may be realized. Also, a predetermined error correction code (ECC) may be used to correct detected errors identified in a code block, including, without limitation, a Reed-Solomon (RS) ECC or a low density parity check (LDPC) ECC, both of which are well-known in the storage art. A code block is a grouping of one or more stream chunks, to which one or more ECC have been included. An ECC technique can be multilevel, multidimensional, or both. An ECC implementation may assist in maintaining the integrity of data, particularly if a low BER is desired. In addition, a multi-block ECC implementation may be used to recover data corresponding to one or more code blocks.

Figure 5A:
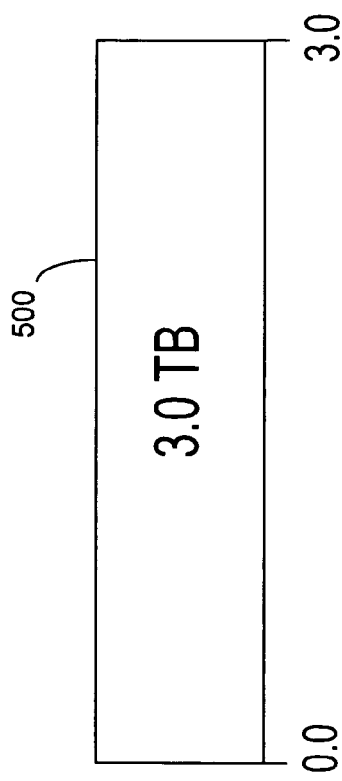
FIG. 5A is a block diagram illustrating the LBA address space of a prior art storage device.
Figure 5B:
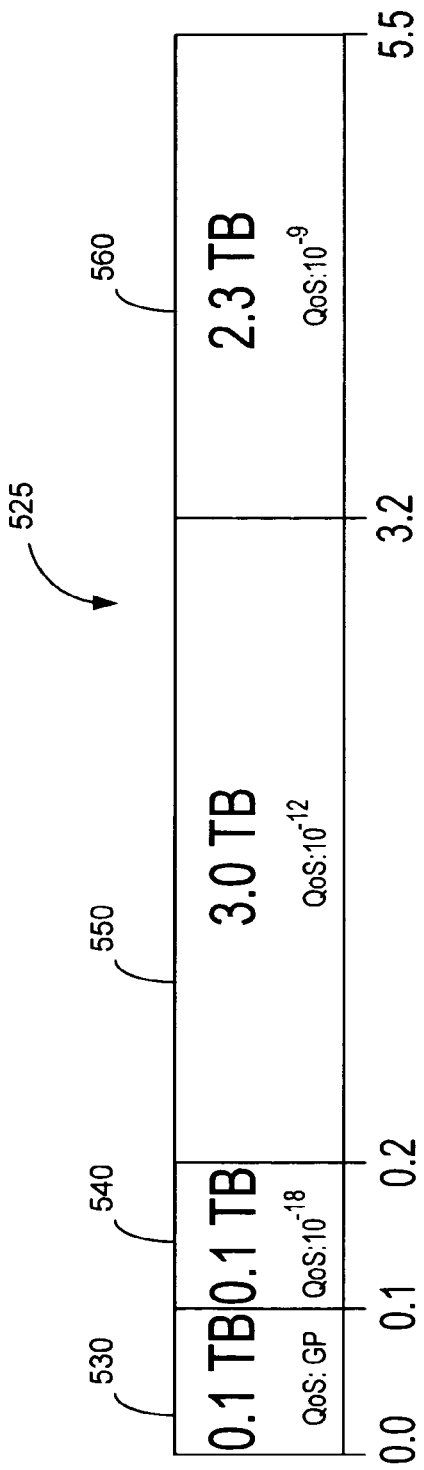
FIG. 5B is a block diagram illustrating the LBA address space of a storage device in accordance with the teaching of the invention herein.

Turning to FIGS. 5A and 5B, a typical linear logical block address space 500 can be described by FIG. 5A and a selective QoS logical block address space 525 according to a present embodiment can be described by FIG. 5B. LBA space 500 may correspond to a 3.0 terabyte (TB) disk drive, utilizing a default QoS configured into the disk drive by a HDD manufacturer (not shown). Typically, QoS may not be configurable after manufacturing. For example, LBA space 500 may represent a 3.0 TB drive configured to provide random access to data, and having a default QoS BER of about $10^{-15}$. On the other hand, LBA space 525 may correspond to a 5.5 terabyte (TB) disk drive, utilizing QoS methods described herein. In FIG. 5B, LBA space 525 is shown as being partitioned into four (4) separate QoS zones, each employing a different QoS BER for data stored thereon.

For example, first QoS partition 530 may represent 0.1 TB of storage allocated with a general purpose (default) first QoS BER of about $10^{-15}$. Second QoS partition 540 may represent 0.1 TB of storage allocated with a second QoS BER of about $10^{-18}$. QoS partition 540 may be used to store data for which higher reliability, and thus, a lower BER is selected. Third QoS partition 550 and fourth QoS partition 560 each may be configured with respective QoS BERs higher than the default value of $10^{-15}$, for example to store data which may be more tolerant of errors. In the case of third QoS partition 550, 3.0 TB of storage may be allocated with a third QoS BER of about $10^{-12}$. Similarly, fourth QoS partition 560 may represent 2.3 TB of storage allocated with a fourth QoS BER of about $10^{-9}$. One example technique which may be used to obtain a selected QoS BER may include selecting a corresponding areal density. A practical consequence of decreasing areal density, and thus, increasing corresponding QoS BER (i.e., allow more errors), may be to increase the effective data storage space, as viewed from the perspective of host 210. As a result, it may be possible to significantly increase the effective amount of storage available on disk drive 200, for example, by relaxing error requirements of the stored data, relative to the default QoS BER corresponding to disk drive 200 media.

FIG. 6 illustrates a non-limiting example correspondence between QoS parameters and areal density (AD) ratio, with selected QoS parameters corresponding to a predetermined QoS tag, which may be used by one or more of host 210, host adapter 218, and storage device 200. As described above, QoS may include a command behavior parameter 610, e.g., QoS command completion time (CCT), in addition to a data behavior parameter 620, e.g., QoS BER. In an example in which the streaming default, or general purpose, QoS BER of a disk drive, such as disk drive 200, can be about $10^{-18}$, an increase in AD ratio 630 is shown to correspond to a reduction of QoS BER data behavior parameter 620. Continuing with the example of FIG. 6, QoS TAG 600 may be used to select a QoS tuple corresponding to the <CCT, QoS BER> tuples <610, 620>. For example, QoS tag 0x00 may cause host 210 to record data on disk drive 200 using a QoS BER of about $10^{-9}$, and to prioritize completion of the corresponding QoS command within less than 0.1 second. Of course, other tags, data behaviors, and command behaviors may be used, with the number of possible QoS selections being greater or lesser than shown in FIG. 6.

With regard to FIGS. 1, 5 and 6, an example sequence by which host 110 may control storage device 150 can be described. In addition, TABLE 1 provides further illustration of the following example:

TABLE 1

| Partition No. | Host Command Sequence: | Storage Device Response |
|---|---|---|
| 1 | QoS_sense(0.1) | [6.0, 5.0, 4.0, 3.0] |
| 1 | QoS_select(0.1, 0.2, 0x11) | |
| 2 | QoS_sense(0.2) | [5.8, 4.9, 3.9, 3.0] |
| 2 | QoS_select(0.2, 3.2, 0x01) | |
| 3 | QoS_sense(3.2) | [5.5, 5.1, 4.7, 4.3] |
| 3 | QoS_select(3.2, 5.5, 0x00) | |
| 4 | QoS_sense(5.5) | [5.5, 5.5, 5.5, 5.5] |

As described above, non-limiting examples of a host/device command protocol may be a "QoS Select" command and a "QoS Sense" command. In selected embodiments, a "QoS select" command may permit host 210 to select from a list of options for desired QoS, as well as a maximum available LBA for each QoS option, with respect to a minimum LBA for streaming data. Storage device 150 may be, for example, a 3.0 TB random access HDD. Host 110 may begin the control sequence issuing "QoS sense" command 170 with a minimum LBA representing 0.1 TB (100 GB) of general purpose data. In the present example, possible QoS choices for minimum uncorrectable BER can be represented by the array [9, 12, 15, 18] in units of –log (BER). In response to the "QoS sense" command 170, storage device 150 communicates to host 110 an array of maximum LBA values, which may be associated with corresponding QoS choice, for example, [6.0, 5.0, 4.0, 3.0], shown in units of TB. Host 110 now may select the LBA partition size to be associated with a corresponding QoS level.

A "QoS select" command may be used to provide the host a simple technique to select the minimum and maximum LBA, and selected QoS level for a selected LBA QoS partition. In an example in which host 110 is a digital video recorder (DVR), the first QoS partition may be a 100 GB data space for GP data, which may be accessed randomly. LBAs below the first partition minimum LBA would remain standard HDD usage, and thus be referred to as general purpose (GP) data. Host 110 may use the QoS sense command to communicate the minimum LBA so that one, or both, of host/device interface 125, or storage device 150 may apply streaming attributes to data received for recording. Storage device 150 may respond to host 110 with an array of possible maximum LBA choices, which may depend on a selected QoS BER and CCT. After a first AV partition has been assigned a corresponding QoS and size, less LBA space may be available for subsequent QoS options. For example, a second QoS partition might be AV system data, for which 100 GB may be allocated and a second QoS BER of about $10^{-18}$ may be selected. A subsequent QoS sense command request to storage device 150 may return a new value array, for example, (approximately) [5.8, 4.9, 3.9, 3.0]. For a third QoS partition, the DVR host 110 may choose a 3.0 TB space for high definition TV programs and an associated QoS BER of about $10^{-12}$. In this example the QoS select command may use a minimum LBA corresponding to about 200 GB, may select a maximum LBA corresponding to about 3.2 TB, and may select a QoS BER of about $10^{-12}$. In general, the media resources required to provide 3.0 TB of storage, having a QoS BER of about $10^{-12}$, can be less than that of storage having a corresponding QoS BER of $10^{-18}$. In this example, the media efficiency gain may be a factor of about 1.33 for an initial three (3) orders BER change magnitude (e.g., from about $10^{-18}$ to about $10^{-15}$, with an additional media efficiency gain of about 1.25 for a subsequent three (3) orders BER change magnitude (e.g., from about $10^{-15}$ to about $10^{-12}$). A subsequent QoS sense command, where the minimum LBA corresponds to about 3.2 TB may yield another new value array, for example, (approximately) [5.5, 5.1, 4.7, 4.3].

Finally, DVR host 110 may choose to assign the remaining media resources to a partition having a QoS BER of $10^{-9}$, for example, to store standard definition TV programs. The final QoS select command issued by host 110 sets the last partition such that the effective HDD capacity may be about 5.5 TB, which may be realized with a 3.0 TB random access HDD. After partitioning has completed, host 110 has created a four-partition HDD, with each partition being associated with QoS levels, suitable to the respective partition's data content.

Figure 7:
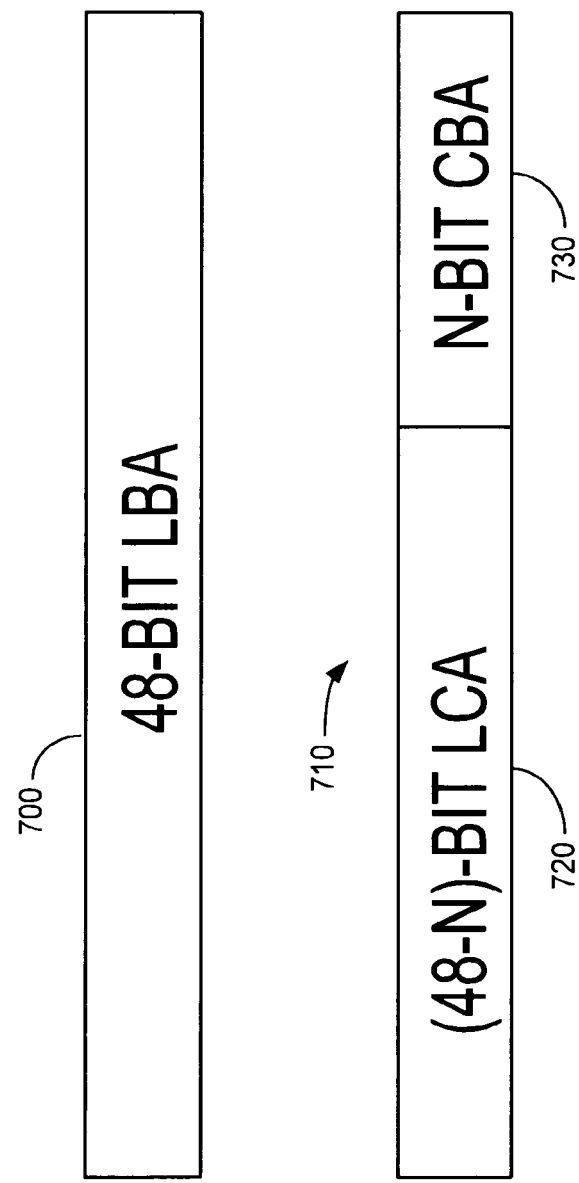
FIG. 7 is a block diagram illustrating a 48-bit LBA and a 48-bit SCA in accordance with the teaching of the invention herein.

FIG. 7 illustrates a technique by which stream chunk size may be selected, within a context of FIG. 1 and an extension of a current standard set, namely ATA/ATAPI-7 V1 (2004), in which the optional 48-bit Address feature set employs a 48-bit LBA 700. A stream chunk may be an atomic grouping of contiguous LBAs that host 110 has chosen for its smallest stream sequence. In selected present embodiments, this 48-bit LBA may be used to describe stream chunk address (SCA) 710, which may include logical chunk address (LCA) 720, and chunk bit address (CBA) 730. Although a stream chunk may be managed by host 110 and device 150, host 110 may select chunk size by issuing, for example, a CHUNK-SIZE(N) command, where CBA 730 can be chosen to be the lower N bits of SCA 710. An example chunk size value may be selected as a function of $2^N$, with N being equal to 14 bits, although any other size also may be selected. A value of $2^{14}$ may be useful to simplify block alignment in implementations, using a 4 KB block size. In this instance, a 14-bit CBA 730 can correspond to a 34-bit LCA 720 to form the 48-bit SCA space. When N=14, it may be possible to provide about 16K blocks/chunk ($2^{14}$=about 16K), so that a stream chunk of about 64 MB ($2^{14}$ blocks/chunk*about 4 KB/block=about 64 MB/chunk) may be provided. Similarly, a value $2^{17}$ (a 17-bit LCA 720) may be employed to provide a 64 MB stream chunk in implementations using a 512-byte block size. In addition, a 1.0 TB stream sequence may include about 16K chunks, each having a size of about 64 MB. A selected block within a stream sequence may be described by selected chunk address 710 using LCA 720 to identify the location of the corresponding chunk within the stream sequence, and CBA 730 to identify the location of the selected block within the corresponding chunk. The technique described with respect to FIG. 7 may be used by host 110 to control file fragmentation, for example, by managing large files as a linked list of stream chunks.

Figure 8:
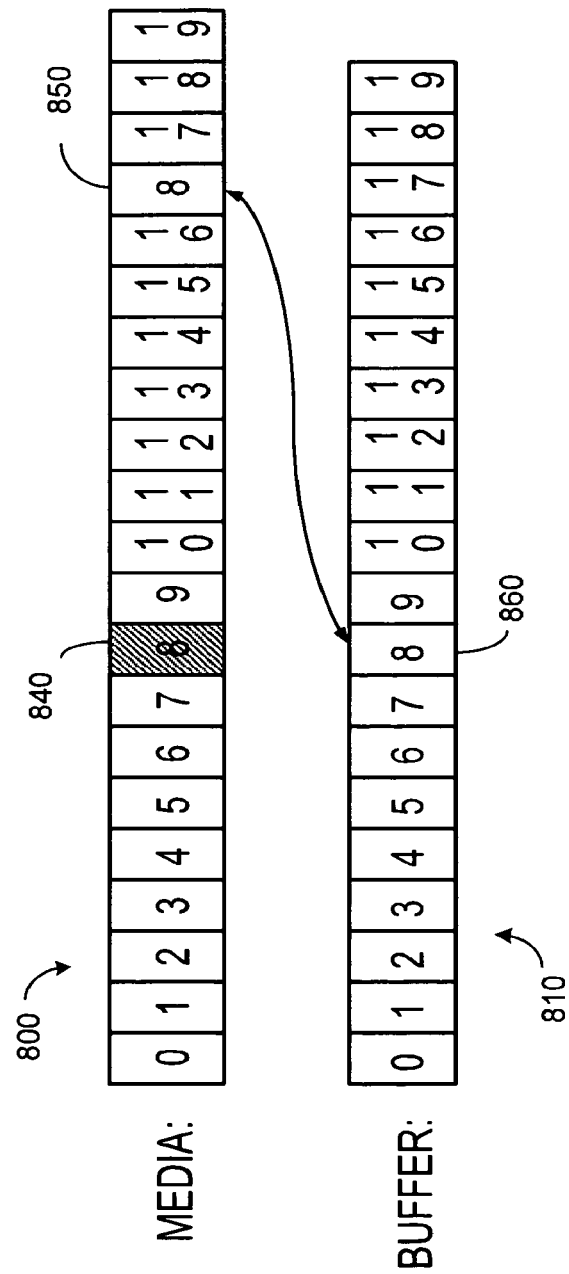
FIG. 8 is a graphical depiction of a Read-after-Write data block re-allocation in accordance with the teaching of the invention herein.

FIG. 8 illustrates an implementation of a Read-after-Write (RAW) streaming operation, as described above. In FIG. 8, data space 800 may correspond to a media data space, as may be found on a portion of disk (media) 205; and data space 810 may correspond to a buffer data space, which may be used during a RAW operation. In accordance with selected embodiments of a RAW operation, blocks can be written to media during stream writing on a first track, and then can be read back and checked for errors (read/verify). In certain embodiments of a RAW operation, a read/verify process may be subsequent to writing all, or a substantial portion of, selected tracks, after the tracks have been recorded on media. In certain other embodiments of a RAW operation, a read/verify process may be employed to check data previously written on a first media track substantially concurrently with data located subsequently in a stream sequence being written to a subsequent second media track. By verifying the written data in its final form, deleterious effects of write errors, adjacent track interference, and media faults may be identified and corrected on a media track, e.g., media track 800, while the corresponding data still may be currently stored in a buffer, e.g., buffer 810. An error correction code may be employed to identify and correct, for example, a poorly written block, by re-writing the faulty block downstream, in general proximity to the original location of the faulty block. In FIG. 8, faulty block 8 (840) may develop after being written on media track 800. Using a selected embodiment of a RAW operation, faulty block 8 (840) may be read back, be checked, be corrected and be re-written as substitute block 8 (850), between block 16 and block 17, using valid buffered data block 8 (860), which may still be stored in buffer 810. Substitute blocks, such as substitute block 8 (850) may be written to media 205 with an out-of-order identifier to permit later out-of-order sorting. A non-limiting example of an out-of-order identifier may be an "LBA tag" identifier. An "LBA tag" identifier may be used to facilitate block reordering, for example, during a subsequent read operation, e.g., into buffer 810. Host 110 may be unaware of on-the-fly block reallocation, simplifying host operations.

Figure 9A:
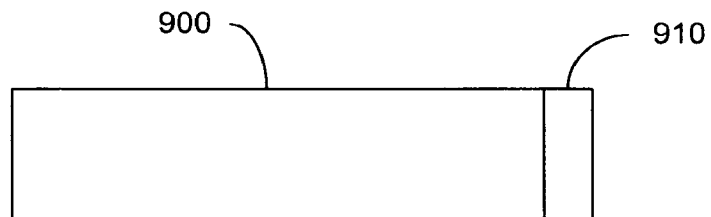
FIG. 9A is a block diagram illustration of a stream chunk storage having a RAW pad appended thereto in accordance with the teaching of the invention herein.
Figure 9B:
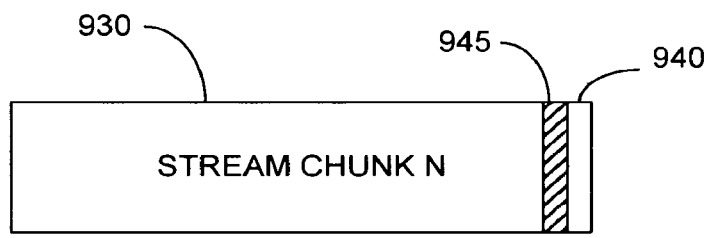
FIG. 9B is a block diagram illustration of a stream chunk storage having an appended RAW pad, as in FIG. 9A, having re-allocated blocks in accordance with the teaching of the invention herein.
Figure 9C:
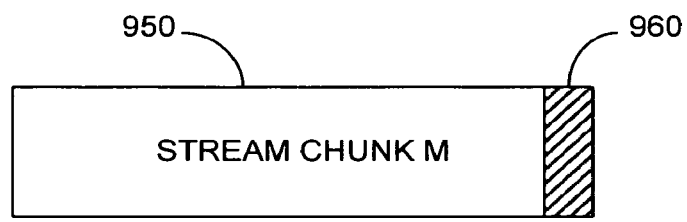

FIGS. 9A-9C generally illustrate aspects of RAW padding. FIG. 9A illustrates a mechanism by which a stream chunk may accommodate re-written blocks, for example, during a RAW operation. In selected present embodiments of RAW padding, physical space allocation for stream chunks, such as stream chunk 900, may be slightly larger than that which otherwise may be designated by host 110 as a selected chunk size, so that margin, such as additional storage location pad 910, may be allotted for RAW reallocation. Currently, about 0.5% to about 1% of available storage space on a storage device, such as storage device 150, may be allocated for spare sectors, with such spare sectors typically being generally co-located. For example, in a current HDD device, spare sectors typically are disposed towards the outer diameter, or the inner diameter, of storage media. In accordance with some present embodiments, such spare sectors may be distributed among stream chunks, such as stream chunk 900, by increasing physical space allocation for one or more stream chunks by between about 0.5% to about 1% spare storage locations, which may be provided as pad 910. In an example in which stream chunks may be 64 MB in size, in which 16K blocks may be allocated for each chunk (14-bit CBA), a 0.5% RAW pad may correspond to about 80 extra physical blocks being allocated per chunk. Thus, device 150 may allocate about 16,464 blocks of media per chunk (e.g., 16,384 blocks+about 80 block pad=about 16,464 blocks/chunk). In addition, one or more spare chunk areas may be provided to permit chunk re-mapping, for example, in the event of a chunk storage location fault.

FIGS. 9B and 9C illustrate a technique for handling chunk RAW pad overruns. In FIG. 9b, stream chunk N (930) may be provided with Nth RAW pad 940. In this example, only a portion of RAW pad 940 has been used by re-allocated data blocks. In FIG. 9C, stream chunk M (950) may be provided with Mth RAW pad 960. However, once the number of data blocks re-allocated to pad 960 exceeds the size of pad 960, a stream chunk overrun may occur with stream chunk M (950). In an instance in which stream chunk M (950) may be partially overrun, a small amount of additional padding may be append from a spare space, so that stream chunk M (950) may be retained intact. A suitable donor spare space may not be contiguous with, or even adjacent to, stream chunk M (950). However, if stream chunk M (950) encounters a significant overrun, storage device 150 may be configured to evaluate the overrun fault to determine whether the fault may arise from storage device 150 media, or the fault may arise elsewhere in storage device 150. In certain embodiments, if storage device 150 is so configured and a fault within storage device 150 detected, then device 150 may cause adaptation of storage device 150 components in an attempt to remediate the fault. Non limiting examples of remediation may include slider fly-height adaptation, channel adaptation, or write current adjustment. Alternatively, device 150 may cooperate with one or both of interface 125, or host 110, to adapt system 100 components in an attempt to remediate the fault. A perceptible indication of such a fault may be provided to a user (not shown) of system 100.

However, if device 150 determines that a fault arises from storage device 150 media, device may permanently reassign and rewrite stream chunk to an alternate spare chunk area in an attempt to remediate. A storage device fault determination by storage device 150 may be facilitated by a RAW operation. Such on-the-fly stream chunk reassignment may offer a method to provide in-field flaw mapping, which may reduce a practice of a manufacturing process known to persons of ordinary skill in the storage technology art as "flaw scan." During "flaw scan," media are scrubbed, or closely examined, and flawed media sectors may be identified and remapped. Accordingly, in-field flaw mapping, in accordance with selected present embodiments, may save significant HDD manufacturing capital, resources, and production time, which may tend to reduce product cost.

Figure 10:
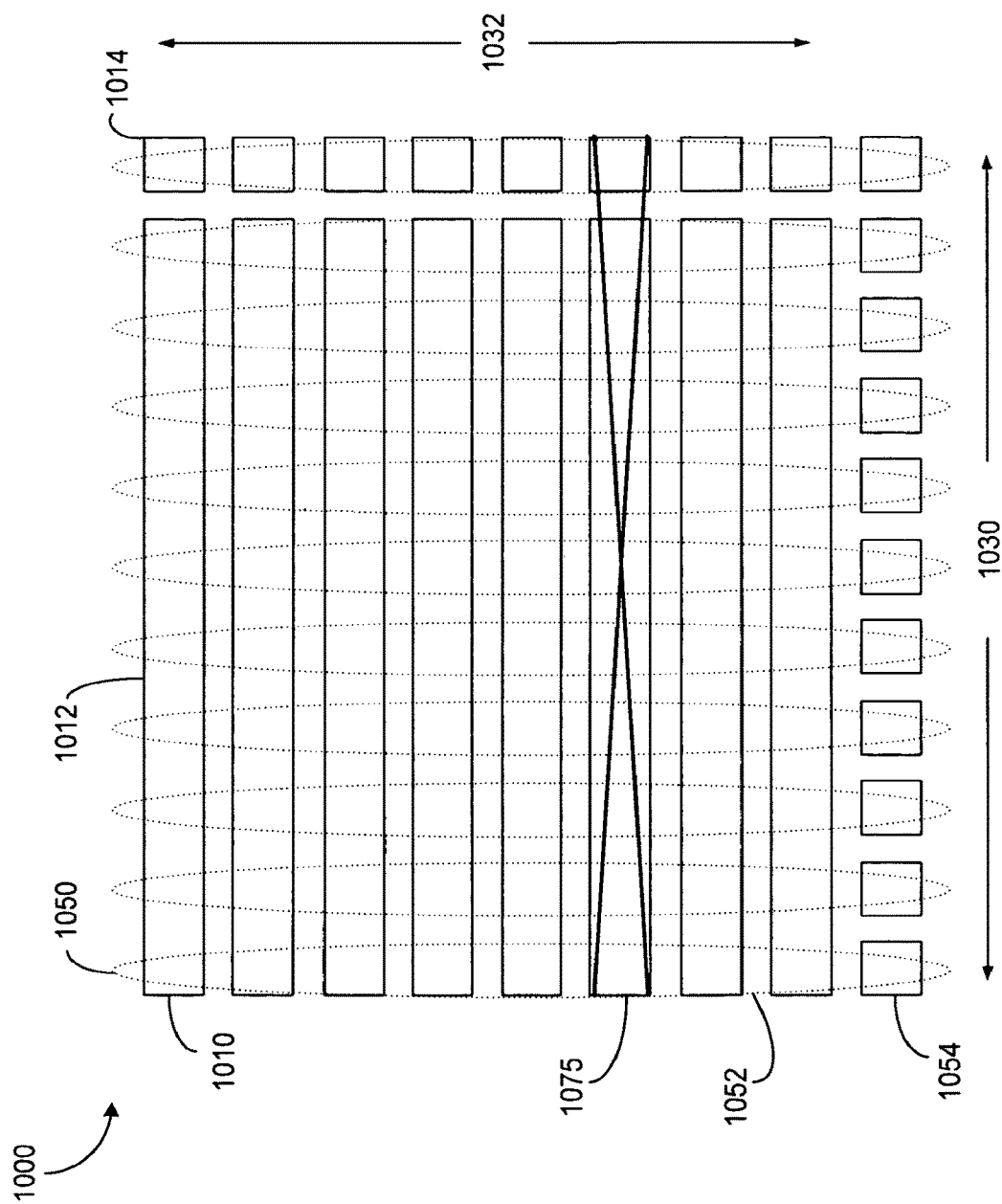
FIG. 10 is a block diagram illustration depicting a multi-block error correction code technique in accordance with the teaching of the invention herein.

FIG. 10 graphically illustrates an error-correction code (ECC) technique 1000. ECC technique 1000 may employ a two-dimensional ECC technique, in which plural rows of code blocks, such as row code block 1010, may be arranged such that columns may be formed thereby, such as column code block 1050. A row code block, such as code block 1010, may include a data block portion 1012 and a corresponding ECC block portion 1014. Similarly, a column code block, such as code block 1050, may include row data block portions forming column data block 1052, and a corresponding ECC block portion 1054. In selected ECC embodiments, a two-level ECC technique may be used, in which ECC symbols are added to the standard block-based ECC. That is, data block portion 1012 is itself a code block having a first-level ECC row code block, and corresponding ECC block portion 1014 may be a second-level ECC row code block. Column code blocks in FIG. 10, such as code block 1050, similarly may use a two-level ECC technique. Such a multi-block ECC code may be useful in detecting and correcting not only individual faults within an identified faulted row block, but also faults within an identified faulted column block. In addition, a multi-block ECC technique as described herein may facilitate recovery of an entire faulty row, such as row 1075, or column. ECC row 1030 may be used to detect and correct errors in ECC column 1032, and vice versa. Also, error correction capabilities may be facilitated by transposing a data stream into columnated ECC data, as shown. Using an ECC technique, such as multi-block ECC technique 1000, streaming data flow allows for the real-time creation of multi-block ECC symbols due to the concatenated sequencing of user data blocks, such that missing blocks may be corrected on-the-fly. Also, multi-block ECC technique, such as technique 1000, may facilitate QoS enhancement, for example, shortened CCT, improved BER for a given areal density (AD), or both.

Figure 11:
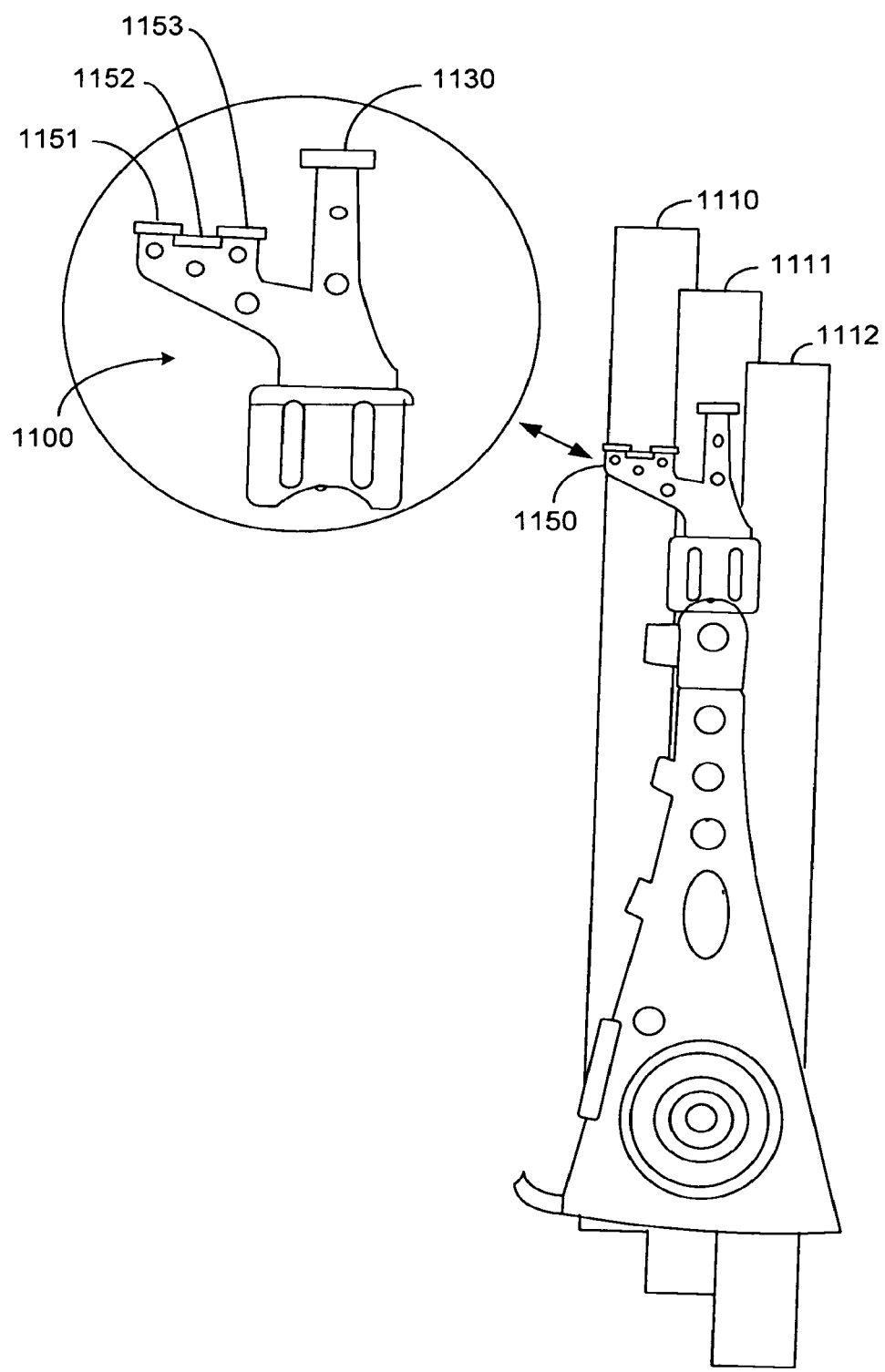
FIG. 11 is a graphical illustration of a disk drive actuator arm adapted for providing RAW operations in accordance with the teaching of the invention herein.

FIG. 11 illustrates an embodiment of RAW slider 1100, which may be used to facilitate on-the-fly RAW operations. RAW slider 1100 also may be used to facilitate in-field flaw mapping, as described above. RAW slider 1100 may be used to read and write data to overlapping media tracks (N−1) 1110, (N) 1111, and (N+1) 1112. RAW slider 1100 may generally be configured to mechanically operate similarly to existing sliders. However, RAW slider 1100 can be configured to perform concurrent read and write streaming operations, in particular, embodiments of a RAW operation. In this regard, RAW slider 1100 may include recording transducer 1130, which may be used to write streaming data to media track (N) 1111. RAW slider 1100 also may include detecting transducer 1150, which may be used to read data, for example, in its final form, as may be found on media track (N−1) 1110, subsequent to a write streaming operation by recording transducer 1130 during a previous writing pass over media track (N−1) 1110. In general, detecting transducer 1130 may be disposed generally in parallel with a longitudinal axis of RAW slider 1100 recording transducer 1130, with a lateral offset approximately equal to the separation desired between a write streaming operation and a read/verify streaming operation. To facilitate accuracy in RAW operations, detecting transducer 1150 may have plural sensors Ra (1151), Rb (1152), and Rc(1153). Sensors 1151-1153 may be overlapping and may be arranged physically to span anticipated media track locations, accounting for mistracking errors including, without limitation, a tracking error, skew, or a radial positional error. Multiple sensors 1151-1153 may be arranged to maximize track coverage. During a RAW streaming operation, sensors 1151-1153 may be selectively operated to properly read a media track of interest. One or more of sensors 1151-1153 may be operated provide a readback signal over a selected track, such as track (N−1) 1110. Also, one or more of the values read by sensors 1151-1153 may be weighted to correct for positional errors or inaccuracies, which may be correctable, for example, using servo positional information relative to track (N−1)

1110 and detecting transducer 1150. For example, readback signal (Rx) may be mixed in the slider or in a preamplifier chip, which may be coupled to actuator assembly 1190. Readback signal (Rx) may be generated according to the equation:

$$Rx=Ka*Ra+Kb*Rb+Kc*Rc$$

where Ka, Kb, and Kc are predetermined sensor weights, which may be used to receive a valid readback signal from track (N−1) 1110. RAW slider 1100 also may operate with random access operations.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as "comprising" (i.e., open language). The term "attached", as used herein, is defined as connected, although not necessarily directly.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention, as defined by the appended claims.

What is claimed is:

1. A host/device interface, comprising:
    a data interface communicatively coupled to transfer data between a host and a storage device;
    a Quality of Service (QoS) interface coupled to the data interface and configured to communicate at least one QoS signal with the host, wherein the QoS interface cooperates with the data interface to selectively manage a storage QoS on the storage device; and
    a controller operative to configure a first physical storage format attribute, defining an areal density of data storage, wherein in response to receiving a first QoS signal, the host directs the controller to write data having a first areal density to a first location on the storage device, and, in response to receiving a second QoS signal, the host defines a streaming data range on the storage device, wherein in the streaming data range the host directs the controller to write data having a second areal density different than the first areal density, wherein, for a data stream, said controller forms a stream chunk from a portion of the data stream and stores the stream chunk in the streaming data range.

2. The host/device interface of claim 1, wherein the streaming data range includes a plurality of stream chunks, each stream chunk corresponding to a predetermined group of contiguous logic block addresses (LBAs).

3. The host/device interface of claim 2, wherein, in response to the second QoS, the host directs a plurality of data tracks to be written to a first stream chunk in the plurality of stream chunks.

4. The host/device interface of claim 3, wherein a first data track of the plurality of data tracks written to the first stream chunk is at least partially overlapped by a second data track written to the first stream chunk.

5. The host/device interface of claim 4, wherein each stream chunk in the plurality of stream chunks is separated by a gap.

6. The host/device interface of claim 1, wherein, the second areal density is greater than that first areal density.

7. The host/device interface of claim 1, wherein, in response to receiving a second QoS signal, the host directs a first data track written to the streaming data range to be partially overlapped by a second data track written to the streaming data range.

8. The host/device interface of claim 7, wherein the first data track and the second data track comprise plural, contiguous data blocks on the storage device.

* * * * *